United States Patent [19]

Curtis et al.

[11] Patent Number: 4,519,671
[45] Date of Patent: May 28, 1985

[54] OPTICAL ATTENUATOR

[75] Inventors: Lyn Curtis, Fair Haven; William C. Young, Middletown, both of N.J.

[73] Assignee: AT&T Bell Laboratories, Murray Hill, N.J.

[21] Appl. No.: 481,483

[22] Filed: Apr. 1, 1983

[51] Int. Cl.³ .................................................. G02B 5/14
[52] U.S. Cl. .................................................. 350/96.15
[58] Field of Search .................... 350/96.15, 96.2, 9

[56] References Cited

U.S. PATENT DOCUMENTS

| 4,145,110 | 3/1979 | Szentesi | 350/96.15 |
| 4,261,640 | 4/1981 | Stankos et al. | 350/96.15 |
| 4,406,732 | 9/1983 | Kayoun | 350/96.29 |

OTHER PUBLICATIONS

S. Masuda, Variable Attenuator for Use in Single-Mode Fiber Transmission Systems, Jul. 15, 1980, vol. 19, No. 14, Applied Optics.
The Bell System Technical Journal, vol. 55, No. 7, Sep. 1976, D. Gloge, pp. 905–916.
The Bell System Technical Journal, vol. 56, No. 5, May–Jun. 1977, D. Marcuse, pp. 703–718.

Primary Examiner—William L. Sikes
Assistant Examiner—Lester Rushin
Attorney, Agent, or Firm—David R. Padnes

[57] ABSTRACT

Continuously variable attenuation between the substantially abutting ends of two optical fibers is provided by varying the angle formed between the fiber ends. In the disclosed embodiment, the ends of two optical fibers are abutted and biased against a fiber receiving member. The varying angle is then formed by displacement of the receiving member.

7 Claims, 6 Drawing Figures

OPTICAL ATTENUATOR

TECHNICAL FIELD

This invention relates to optical attenuators and more particularly to an optical attenuator which provides continuously variable attentuation between substantially abutting optical fibers.

BACKGROUND OF THE INVENTION

Optical attenuators provide a variety of useful functions. One function of attenuators is to reduce the intensity of optical signals entering a photosensitive device to preclude device damage and/or overloading. In other applications, attenuators may serve as noise discriminators by reducing the intensity of spurious signals received by an optical device to a level below the device response threshold. In still other applications, attenuators are used to simulate the operation of optical systems without the need for long lengths of optical fibers.

Optical attenuators which provide fixed and variable amounts of attenuation are commercially available. Fixed attenuators, however, are oftentimes undesirable for attenuator applications as the commercially available attenuation values only approximate the precise attenuation required and/or many different valued fixed attenuators are required. On the other hand, while commercially available variable attenuators avoid the above problems, the range of attenuation may be insufficient for certain applications. Moreover, the apparatus is not readily available for use with either multimode or monomode fibers.

SUMMARY OF THE INVENTION

In accordance with the present invention, a variable optical signal attenuator is provided by varying the angular misalignment of two signal conducting optical fibers. In the disclosed embodiment, the ends of two optical fibers are abutted and biased against a fiber receiving member. The receiving member is then displaced so that a varying angle is formed between the fiber ends. The resulting attenuation between the optical fibers can be varied over a wide range with virtually no hysteresis. Moreover, the described technique is adaptable for use with either multimode or monomode fibers.

DETAILED DESCRIPTION

Figure 1:
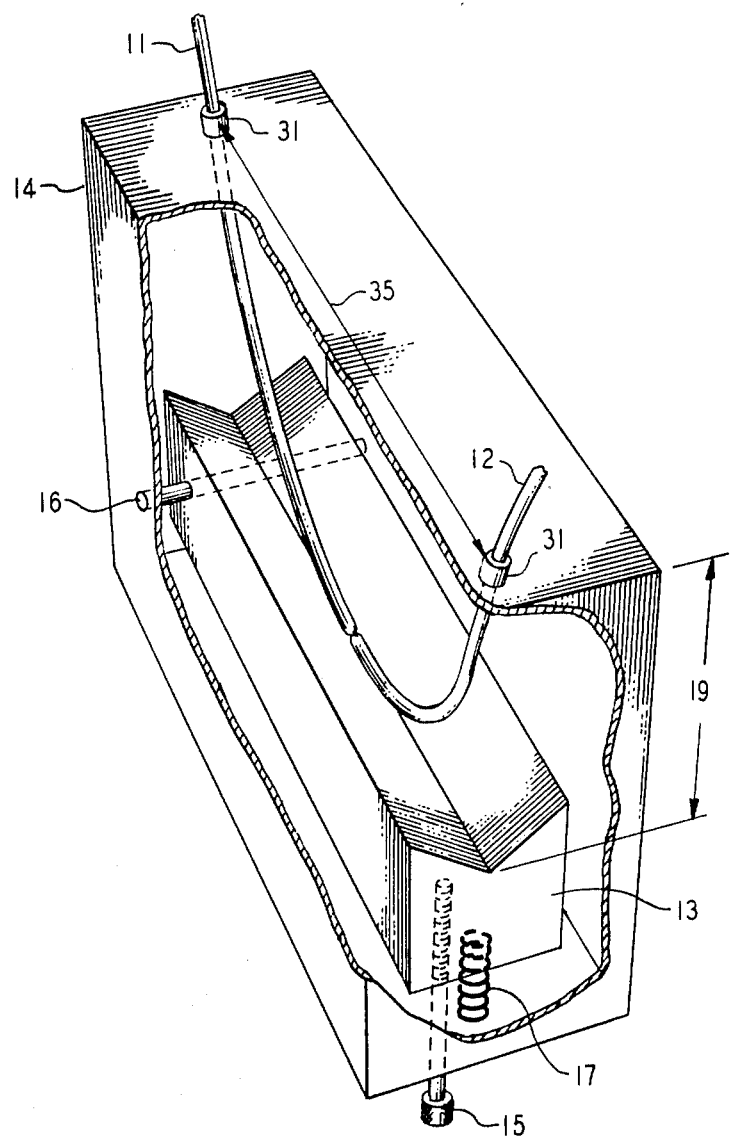
FIG. 1 is a perspective view of the embodiment of the present invention.

FIG. 1 shows an attenuator in accordance with the present invention which supplies continuously variable attenuation between signal conducting optical fibers 11 and 12. As will be described, continuously variable attenuation is provided by varying the angular misalignment of the substantially abutting ends of fibers 11 and 12. While this misalignment can be provided in a number of ways, it is preferably provided by the displacement of fiber receiving member 13. As a result, damage to the fragile optical fibers is minimized. In addition, the attenuation can be advantageously varied with virtually no hysteresis by continuously biasing the ends of the optical fibers against fiber receiving member 13.

The attenuator comprises a movable fiber receiving member 13 disposed within housing 14. Fibers 11 and 12 are introduced into housing 14 via apertures in surface 29 and are received by member 13 in an end-to-end relationship. For accurate positioning of the optical fiber ends, fiber receiving member 13 is a V-groove channel. Movement of member 13 is accomplished by turning adjusting screw 15 to cause member 13 to pivot about pin 16. Accurate tracking of member 13 with respect to movement of screw 15 is assured by compression spring 17 disposed between the underside of member 13 and housing 14.

Figure 2:
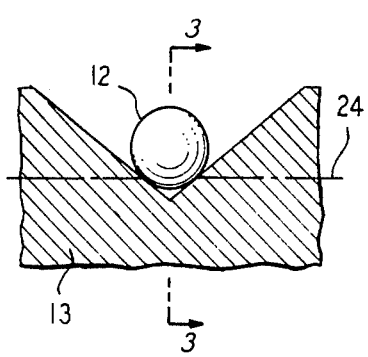
FIG. 2 is a side view of the fiber receiving member of FIG. 1.
Figure 3:
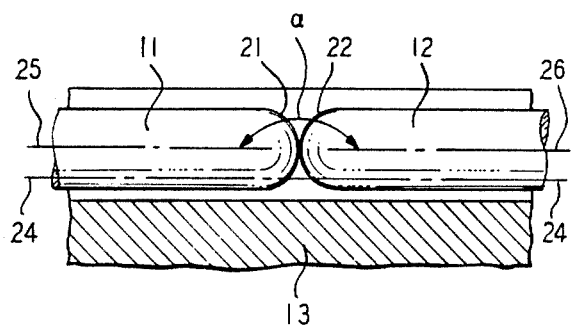
FIG. 3 is a sectional view of FIG. 2 taken along section line 3—3.

FIGS. 2-5 illustrate the angular misalignment of the ends of fibers 11 and 12 with displacement of member 13. As shown in FIGS. 2 and 3, ends 21 and 22 of fibers 11 and 12, respectively, are accurately aligned end-to-end and there is substantially zero signal attenuation between the fibers. When so aligned, fibers 11 and 12 each tangentially contact member 13 at points lying in plane 24 and an angle $\alpha$ of 180° exists between longitudinal axis 25 of fiber 11 and longitudinal axis 26 of fiber 12.

Figure 4:
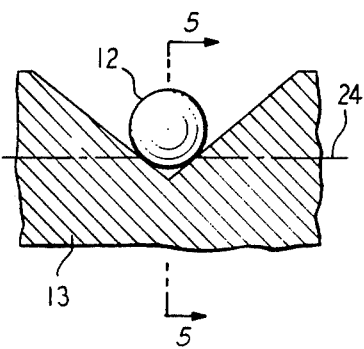
FIG. 4 is a side view of the fiber receiving member of FIG. 1 after displacement of the same to provide optical attenuation.
Figure 5:
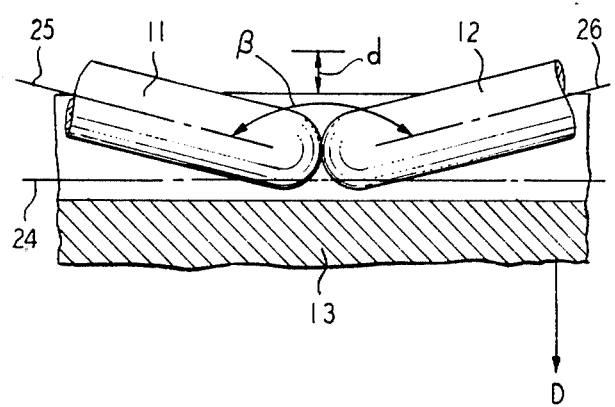
FIG. 5 is a sectional view of FIG. 4 taken along section line 5—5.

In FIGS. 4 and 5 member 13 has been pivoted about pin 16, resulting in a displacement d of the abutting ends 21 and 22 along the vertical direction D. Such pivoting results in a tilting of member 13 with respect to the horizontal in FIGS. 4 and 5. However, because the magnitude of d is small, the tilting is slight and is not shown for purposes of simplicity in FIGS. 4 and 5. As shown in FIG. 5, angle $\beta \neq \alpha$, now exists between the longitudinal axes 25 and 26. This change in angle, i.e., angular misalignment, results in greater attenuation between the signal conducting optical fibers 11 and 12. It should be noted that in FIGS. 4 and 5 fibers 11 and 12 still tangentially contact member 13 along points lying in plane 24 due to the biasing of fiber ends 21 and 22 against member 13.

Refer now to FIG. 1. Biasing of the fiber ends can be readily provided over the displacement range of member 13 by setting the distance 19 between plane 24 and surface 29 of housing 14 for maximum pivoting of member 13 to be less than the lengths of fibers 11 and 12 inserted into housing 14. Once inserted through their respective apertures in surface 29, the fibers are secured relative to housing 14 through the use of strain relief bushings 31. Additionally, the center-to-center spacing 35 between the apertures in housing 14 should be large enough to avoid sharp bending of the inserted optical fibers.

It has been found that the above-described biasing of the fiber ends 21 and 22 against member 13 maintains precise transversal fiber alignment. Accordingly, the attenuation provided is solely due to the angular misalignment of the fiber ends. The use of spherically rounded ends 21 and 22, as illustrated, advantageously controls the attenuation provided by precluding transverse misalignment, i.e., the shifting of one fiber end relative to the other along direction D. Attenuator operation can also be enhanced through the use of index matching fluid (not shown) between the fiber ends.

Such fluid provides lubrication and reduces fresnel losses.

Figure 6:
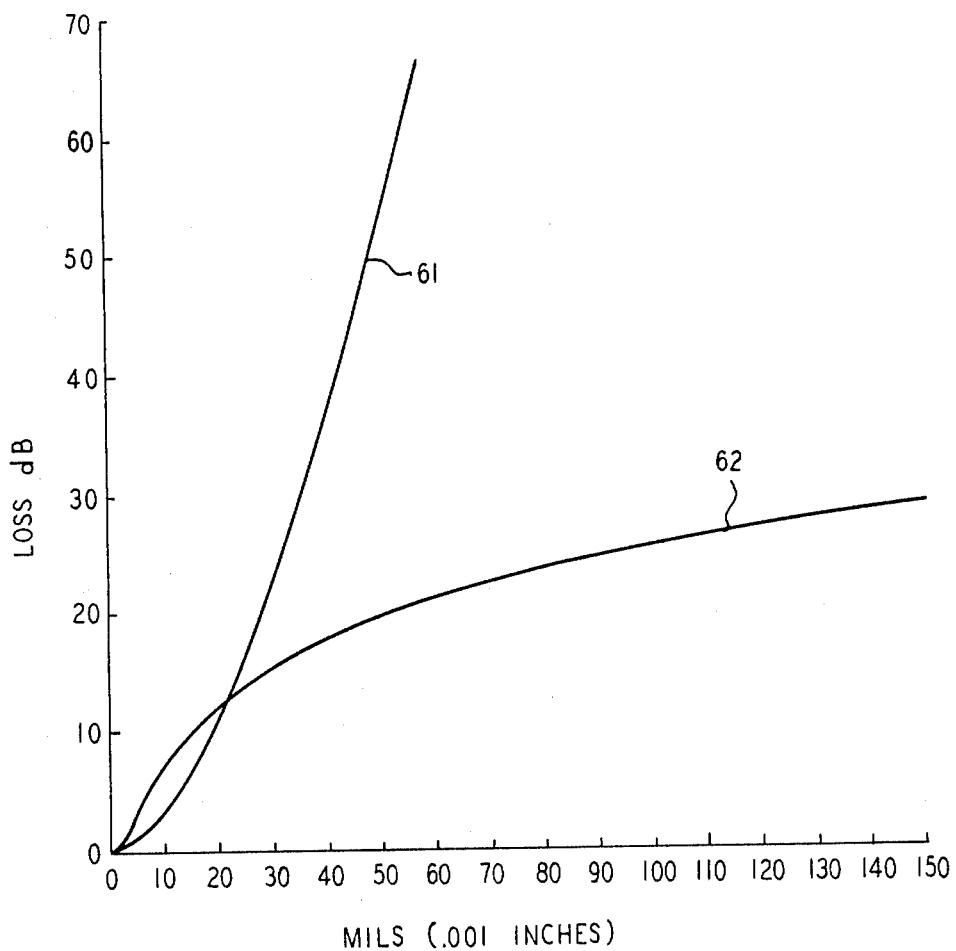
FIG. 6 is a plot of the attenuation provided by the present invention vis-a-vis prior art attenuators.

Curves 61 and 62 in FIG. 6 respectively illustrate the range of attenuation provided by the present invention and prior art attenuators. The prior art attenuators referred to are those which vary the end separation between the fibers. For an example of this type of attenuator, see U.S. Pat. No. 4,145,110, issued Mar. 20, 1979. In FIG. 6, the horizontal axis corresponds to the displacement of member 13 along direction D in mils (0.001 inches) for curve 61 and corresponds to the end separation between aligned optical fibers for curve 62.

It should, of course, be understood that the present invention may be embodied in a number of specific forms without departing from the spirit or scope of the present invention. First, for example, member 13 can comprise a number of V-groove channels with each channel receiving a pair of substantially abutting optical fibers. This arrangement would provide substantially the same attenuation between each abutting optical fiber pair. Or, alternatively, the attenuator can comprise a number of fiber receiving channels which are independently displaceable with respect to one another so that the attenuation provided between optical fiber pairs is individually adjustable. Second, varying the angular misalignment of the two optical fibers does not require movement of each fiber end. One fiber end could be fixed and the other fiber end displaced so as to form a varying angle therebetween. Finally, displacement of channel 13 can be provided by maintaining the same on the mechanical stage.

What is claimed is:

1. Apparatus for providing variable attenuation of an optical signal, said apparatus comprising
means adapted to receive at least one pair of signal conducting optical fibers each having a longitudinal axis wherein the fibers in each pair are in series with one another and the fiber ends in each pair abut one another,
means for biasing the ends of any received pair of optical fibers against said receiving means, and
means for forming a variable angle between the the longitudinal axes of any received pair of optical fibers while maintaining contact between the ends of said pair of fibers, said optical signal attenuation being a function of said formed angle.

2. The apparatus of claim 1 wherein said receiving means comprises a structural member having a V-groove formed therein.

3. The apparatus of claim 2 wherein the ends of said optical fibers are spherical.

4. The apparatus of claim 3 wherein said forming means displaces said receiving means to form said variable angle.

5. The apparatus of claim 4 wherein said receiving means is adapted to receive one pair of signal conducting optical fibers.

6. The apparatus of claim 1 wherein said variable angle is less than or equal to 180°.

7. A method of providing variable attenuation of an optical signal comprising the steps of receiving at least one pair of signal conducting optical fibers wherein the fibers in each pair are in series with one another and the fiber ends in each pair abut one another, biasing the ends of any received pair of optical fibers against a surface, and forming a variable angle between the ends of any received pair of optical fibers while maintaining contact therebetween.

* * * * *